Patented Mar. 10, 1925.

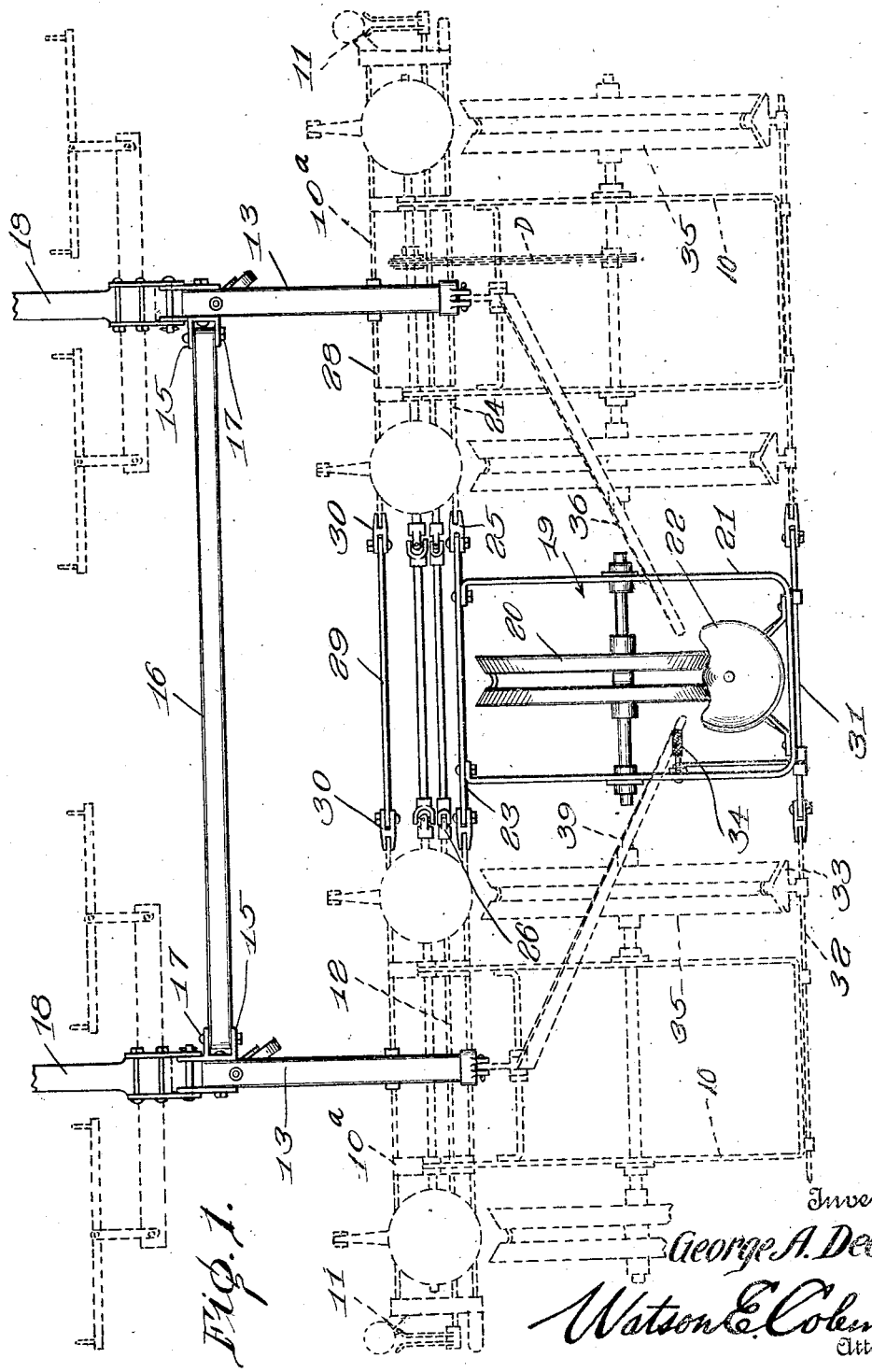

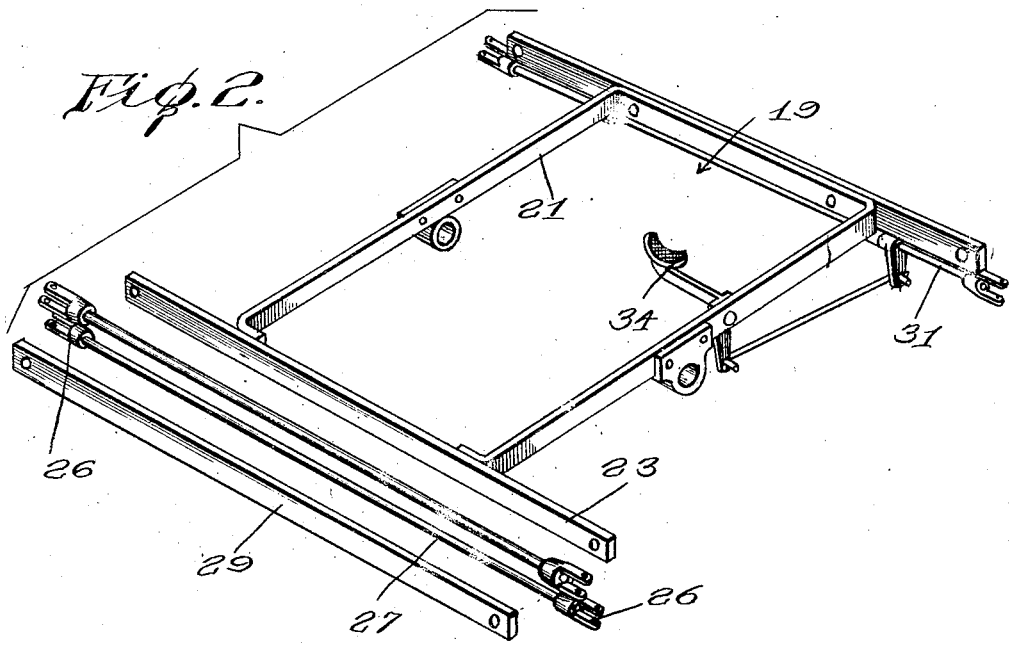
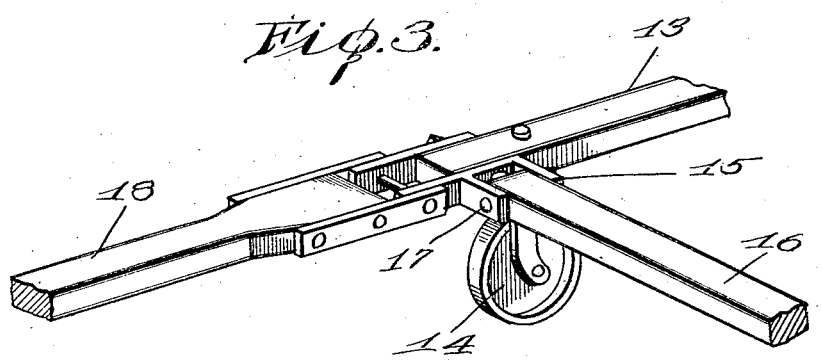

UNITED STATES PATENT OFFICE.

1,529,468

GEORGE A. DECKER, OF MANCHESTER, SOUTH DAKOTA.

PLANTER.

Application filed September 11, 1922. Serial No. 587,375.

*To all whom it may concern:*

Be it known that I, GEORGE A. DECKER, a citizen of the United States, residing at Manchester, in the county of Kingsbury and State of South Dakota, have invented certain new and useful Improvements in Planters, of which the following is a specification, reference being had to the accompanying drawings.

This invention relates to improvements in planters, and an important object of the invention is to provide means whereby a pair of planters may be connected together for control and operation by a single driver.

A further object of the invention is to provide a connection adapted to be disposed between two planters arranged in side to side relation and to connect the same so that a single set of operating mechanism suffices for the operation of both of the planters.

A still further object of the invention is to provide means of this character so constructed as to render the handling of the combined planters as simple as the handling of a single planter.

An additional object of the invention is to provide an attachment of this character which is extremely durable in service and efficient in its operation.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a plan view showing two planters connected with apparatus constructed in accordance with my invention, the planters being shown in dotted lines;

Figure 2 is a perspective view of the frame of the attaching member and the connecting parts removed;

Figure 3 is a detail perspective view showing the manner of attaching and connecting the planter tongues; and Figure 4 is a sectional view showing the hinged connection employed.

Referring now more particularly to the drawings, the numeral 10 indicates planters, in the present instance these being illustrated as two row planters and adapted to be operated by suitable checking apparatus indicated at 11, the checker shaft being indicated at 12. The numeral 13 designates planter tongues which in the combined structure I prefer to provide with caster rollers 14 for supporting the forward ends of the tongues. To each tongue 13 I secure brackets 15 at that side thereof next adjacent the tongue of the other planter, and between these brackets extends a spacing bar 16 pivotally connected at its ends, as indicated at 17, to the brackets. Draft tongues 18 are pivoted to the forward ends of the planter tongues 13 for vertical oscillation so that vertical movement of the draft animals or draft appliance will not effect a vertical movement of the forward end of the planter at which the planting boots are arranged.

Arranged between the planters 10 is a spacing and controlling frame 19 embodying a supporting wheel 20 and a frame 21 supported by the wheel and having a seat 22 for the driver. At its front and rear ends the supporting frame is provided with cross bars 23, the ends of which have pivotal connection with the adjacent ends of similar cross bars 24 forming a normal port of the main frame of the planters, this pivotal connection being indicated at 25. The adjacent ends of the checker and seeder shafts of the planters are connected by universal joints 26 with bridging shafts 27 so that the operation of one of the checker shafts will cause the operation of the checker shaft of the other planter. The forward cross bars 28 of the adjustable planting frames 10ᵃ of the planters 10 are pivotally connected at their adjacent ends with the adjacent ends of a spacing bar 29, the connection being indicated at 30. At the rear of the planters the usual scraper shafts 31 have pivotal connection with a shaft 32 which is provided with a scraper 33 if so desired for engagement with the wheel 20. This shaft section 32 is operated by means of a foot lever 34 carried by the supporting frame 21 so that the shaft section 32 and scraper shafts 33 may be oscillated to bring the scrapers carried by these scraper shafts into engagement with the packer wheels 35 of the planters. The lifting devices or levers 36 of the planters will be extended so as to have their operating ends arranged adjacent the driver's seat 22 so that either of the planting elements may be lifted when desired without disturbing the other of the planting elements.

It will be obvious that with a structure such as above recited, the planters may pass over very uneven ground and at the same time each thereof is permitted to rise and fall independently, the pivotal connections between the planters effectually preventing vertical movement on the part of one of the planters being transmitted to the other planter. It will furthermore be obvious that the two planters may be conveniently operated by a single person and with but slightly more labor than is ordinarily necessary to the operation of a single planter. The frame 19 may be very readily applied to secure the planters together and may be manufactured at a very low cost.

It will, of course, be obvious that many changes in the construction hereinbefore set forth are possible without in any manner departing from the spirit of my invention and I accordingly do not limit myself to the specific arrangement hereinbefore described except as hereinafter claimed.

I claim:—

1. Means for connecting together for simultaneous actuation a pair of planters having operating shafts, comprising tongues connected with the planters, brackets on the forward ends of said tongues, caster wheels journally supported below said brackets, draft tongues pivotally connected with the forward ends of said tongues and capable of vertical swinging movement, an elongated rigid bar extending transversely with respect to the tongues and pivotally connected with said brackets whereby to permit inequality in the heights of the two planters, a rigid seat carrying frame located between the planters and pivotally connected at its side with the rigid frames thereof, and shafts having universal joint connections with the adjacent ends of the operating shafts of the planters.

2. Means for connecting a pair of planters for simultaneous actuation, comprising tongues connected with the planters and equipped with draft means, a rigid frame located between the planters and including forward and rear bars pivotally connected with the adjacent portions of the planter frames, and maintaining the frames in spaced parallel relation and shafts located in advance of said frame and having universal joint connections with the operating shafts of the planters.

In testimony whereof I hereunto affix my signature.

GEORGE A. DECKER.